(12) United States Patent
Murao (10) Patent No.: US 8,693,775 B2
(45) Date of Patent: Apr. 8, 2014

(54) IMAGE PROCESSING APPARATUS, METHOD, RECORDING MEDIUM, AND PROGRAM

(75) Inventor: Shouta Murao, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/413,872

(22) Filed: Mar. 7, 2012

(65) Prior Publication Data

US 2012/0250992 A1    Oct. 4, 2012

(30) Foreign Application Priority Data

Mar. 29, 2011    (JP) .................................. 2011-073046

(51) Int. Cl.
*G06K 9/00*    (2006.01)
(52) U.S. Cl.
USPC .......................................... 382/167; 348/247
(58) Field of Classification Search
None
See application file for complete search history.

(56) References Cited

U.S. PATENT DOCUMENTS

| | | | | |
|---|---|---|---|---|
| 7,283,164 B2 * | 10/2007 | Kakarala et al. | ............... | 348/246 |
| 7,313,288 B2 * | 12/2007 | Dierickx | ........................ | 382/274 |
| 2003/0063203 A1 * | 4/2003 | Ohno | ............................ | 348/247 |
| 2009/0263017 A1 * | 10/2009 | Tanbakuchi | .................. | 382/167 |

FOREIGN PATENT DOCUMENTS

JP    2010-187308    8/2010

OTHER PUBLICATIONS

Dierickx, B. Missing pixel correction algorithm for image sensors. (May 1998) SPIE vol. 3410, pp. 200-203.*

* cited by examiner

*Primary Examiner* — Vu Le
*Assistant Examiner* — Samah Beg
(74) *Attorney, Agent, or Firm* — Oblon, Spivak, McClelland, Maier & Neustadt, L.L.P.

(57) ABSTRACT

An image processing apparatus includes: a holding section holding a pixel value input thereto; a basic pixel value calculating section calculating a basic pixel value from the pixel values of a plurality of pixels which are neighboring pixels located around a pixel of interest having the pixel value held by the holding section and which have the same color as the pixel of interest; a different color pixel difference calculating section calculating a different color pixel difference which is a difference between the pixel values of neighboring pixels having a color different from the color of the pixel of interest; a combining section combining the basic pixel value and the different color pixel difference to calculate an estimated pixel value of the pixel of interest; and a correcting section correcting the pixel value of the pixel of interest to the estimated value.

21 Claims, 12 Drawing Sheets

IMAGE PROCESSING APPARATUS, METHOD, RECORDING MEDIUM, AND PROGRAM

FIELD

The present disclosure relates to an image processing apparatus and method, a recording medium, and a program. More particularly, the present disclosure relates to an imaging processing apparatus and method which allow precise rendering of colors, and a recording medium and program to be used therewith.

BACKGROUND

A digital camera images an object with an image sensor incorporated therein, and the resultant image is stored in the camera or displayed on the camera.

When the image sensor has defective pixels, the defective pixels have abnormal pixel values. In such a case, the pixel values of defective pixels are corrected (for example, see JP-A-2010-187308 (Patent Document 1)).

SUMMARY

For example, the pixel value of a defective pixel is corrected by estimating the correct pixel value of the defective pixel from the pixel value of a pixel having the same color as the pixel of interest among n×m neighboring pixels located around the defective pixel and substituting the estimated pixel value for the defective pixel value.

However, such a correction carried out based on the method according to the related art has sometimes resulted in the generation of a false color. It has been therefore difficult to render the color of an object precisely.

Thus, it is desirable to allow precise rendering of a color.

An embodiment of the present disclosure is directed to an image processing apparatus including: a holding section holding a pixel value input thereto, a basic pixel value calculating section calculating a basic pixel value from the pixel values of a plurality of pixels which are neighboring pixels located around a pixel of interest having the pixel value held by the holding section and which have the same color as the pixel of interest, a different color pixel difference calculating section calculating a different color pixel difference that is a difference between the pixel values of neighboring pixels having a color different from the color of the pixel of interest, a combining section combining the basic pixel value and the different color pixel difference to calculate an estimated pixel value of the pixel of interest, and a correcting section correcting the pixel value of the pixel of interest to the estimated value.

The different color pixel difference calculating section may calculate a difference between the pixel values of a plurality of pixels residing on the same line on which the pixel of interest resides, preceding the pixel of interest on the line, and having a color different from the color of the pixel of interest, as the different color pixel difference. Alternatively, the different color pixel difference calculating section may calculate a difference between the pixel values of a plurality of pixels residing on the same line on which the pixel of interest resides, succeeding the pixel of interest on the line, and having a color different from the color of the pixel of interest as the different color pixel difference.

The different color pixel difference calculated by the different color pixel difference calculating section may be either a difference between the pixel values of the plurality of pixels preceding the pixel of interest and having a different color or a difference between the pixel values of the plurality of pixels succeeding the pixel of interest and having a different color whichever is greater.

The image processing apparatus may further include a same color pixel difference calculating section calculating a same color pixel difference which is a difference between the pixel values of neighboring pixels having the same color as the pixel of interest. The combining section may combine the basic pixel value, the different color pixel difference, and the same color pixel difference to calculate the estimated value.

The same color pixel difference calculating section may calculate a difference between the pixel values of a plurality of pixels residing on the same line on which the pixel of interest resides, preceding the pixel of interest on the line, and having the same color as the pixel of interest, as the same color pixel difference. The same color pixel difference calculating section may alternatively calculate a difference between the pixel values of a plurality of pixels residing on the same line on which the pixel of interest resides, succeeding the pixel of interest on the line, and having the same color as the pixel of interest, as the same color pixel difference.

The same color pixel difference calculated by the same color pixel difference calculating section may be either a difference between the pixel values of the plurality of pixels preceding the pixel of interest and having the same color or a difference between the pixel values of the plurality of pixels succeeding the pixel of interest and having the same color whichever is greater.

The correcting section may correct the pixel value of the pixel of interest when the pixel value of the pixel of interest is greater than the estimated value in the case that the basic pixel value is greater than the pixel values of the neighboring pixels and may correct the pixel value of the pixel of interest when the pixel value of the pixel of interest is smaller than the estimated value in the case that the basic pixel value is smaller than the pixel values of the neighboring pixels.

The image processing apparatus may be an image sensor.

Another embodiment of the present disclosure is directed to an image processing method including: holding a pixel value input thereto; calculating a basic pixel value from the pixel values of a plurality of pixels which are neighboring pixels located around a pixel of interest having the held pixel value and which have the same color as the pixel of interest; calculating a different color pixel difference which is a difference between the pixel values of neighboring pixels having a color different from the color of the pixel of interest; combining the basic pixel value and the different color pixel difference to calculate an estimated pixel value of the pixel of interest; and correcting the pixel value of the pixel of interest to the estimated value.

Still another embodiment of the present disclosure is directed to an image processing method, a recording medium, and a program corresponding to the image processing apparatus according to the embodiment of the present disclosure.

As described above, according to the embodiment of the present disclosure, a color can be precisely rendered.

DETAILED DESCRIPTION

An embodiment of the technique according to the present disclosure will now be described.

Figure 1:
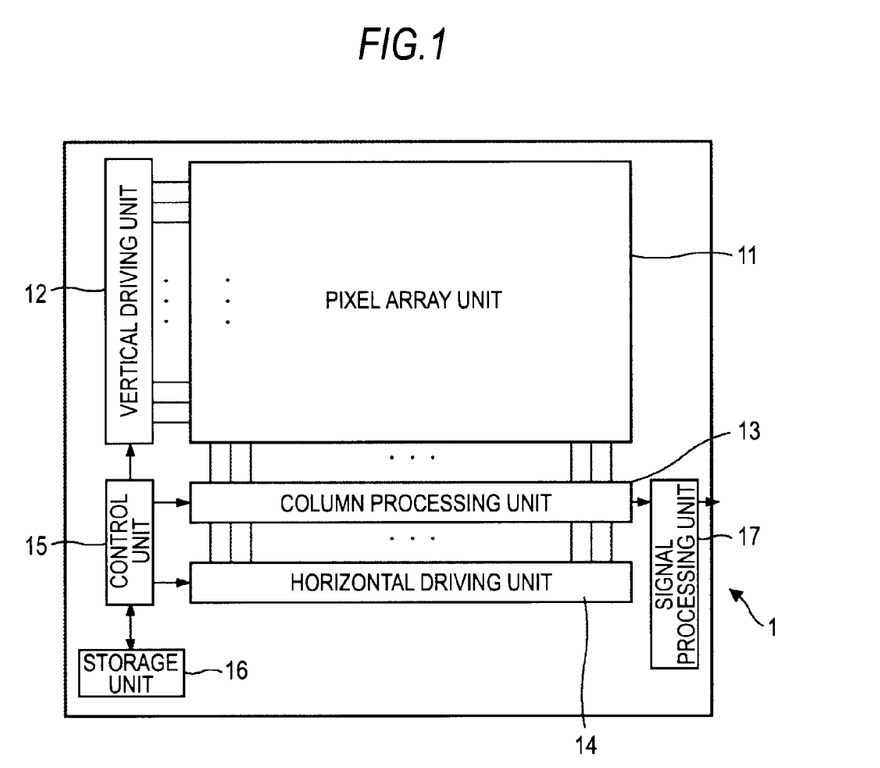
FIG. 1 is a diagram showing a configuration of an image sensor.

FIG. 1 is a diagram showing a configuration of an image sensor 1. For example, the image sensor 1 is a CMOS (complementary metal oxide semiconductor) image sensor, and it includes a pixel array unit 11, a vertical driving unit 12, a column processing unit 13, a horizontal driving unit 14, a control unit 15, a storage unit 16, and a signal processing unit 17.

The pixel array unit 11 includes a plurality of pixels which are arranged in the horizontal and vertical directions. Light from an object is photo-electrically converted by the pixels. The vertical driving unit 12 selects and drives each line that is an array of a plurality of pixels. The horizontal driving unit 14 selects and drives predetermined pixels on each line in the vertical direction. The column processing unit 13 holds pixel data read from the selected pixels and supplies the data to the signal processing unit 17. The control unit 15 controls operations of the various units. Programs to be executed by the control unit 15 are stored in the storage unit 16. The signal processing unit 17 processes the pixel data read out from the column processing unit 13. The correction of the pixel value of a defective pixel described below is performed by this unit.

A description will now be made on the principle of the technique for correcting the pixel value of a defective pixel according to the present disclosure.

Figure 2:
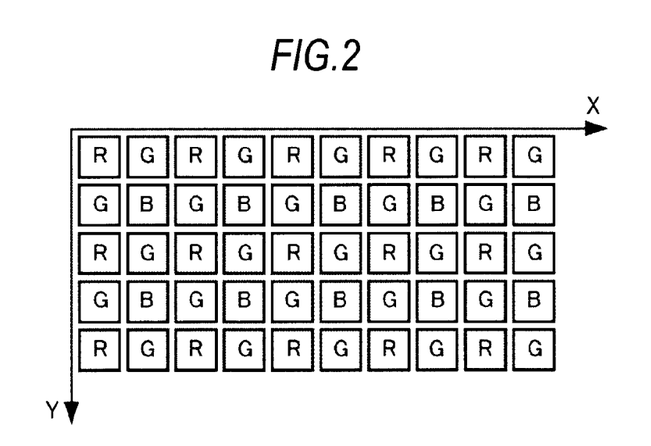
FIG. 2 is an illustration for explaining an arrangement of pixels.

FIG. 2 is an illustration for explaining an arrangement of pixels. In the pixel array unit 11, a plurality of pixels are disposed in the form of a Bayer array as shown in FIG. 2. The horizontal axis X of FIG. 2 represents a horizontal coordinate axis of the pixel array unit 11, and the vertical axis Y represents a vertical coordinate axis of the pixel array unit 11. The characters R, G, and B represent red, green, and blue pixels, respectively. On an odd-numbered row, R and G pixels are alternately arranged starting with an R pixel at the left end. On an even-numbered row, G and B pixels are alternately arranged starting with a G pixel at the left end. For example, referring to the 3×3 array of pixels at the top left corner, the first row of the array is formed by R, G, and R pixels; the second row of the array is formed by G, B, and G pixels; and the third row of pixels is formed by R, G, and R pixels.

Figure 3:
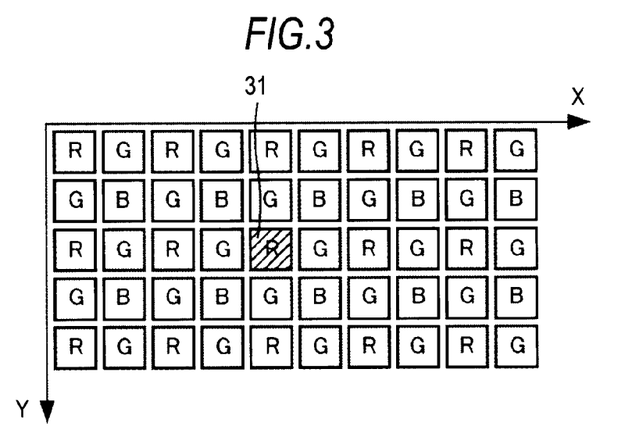
FIG. 3 is an illustration for explaining a defective pixel.

FIG. 3 is an illustration for explaining a defective pixel. In the illustration, an R pixel 31 which is located on the third row from the top and which is located on the fifth column from the left end is a defective pixel.

Figure 4:
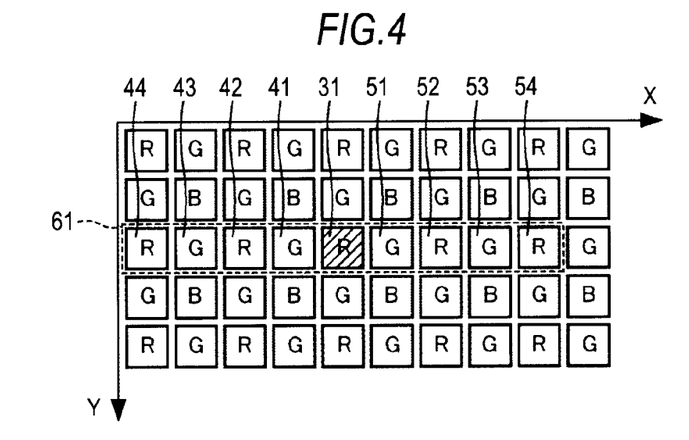
FIG. 4 is an illustration for explaining neighboring pixels.

FIG. 4 is an illustration for explaining neighboring pixels. Referring to FIG. 4, eight pixels located on the same horizontal line on which the defective pixel 31 resides and included in a range 61 are treated as neighboring pixels located around the defective pixel 31. A first group of neighboring pixels is formed by four pixels which are scanned prior to the defective pixel 31 (the pixels shown on the left side of the defective pixel 31 in the figure), i.e., the four pixels in red, green, red, and green numbered 41 to 44 in the order of their closeness to the defective pixel 31. A second group of neighboring pixels is formed by four pixels which are scanned after the defective pixel 31 (the pixels shown on the right side of the defective pixel 31 in the figure), i.e., the four pixels in green, red, green, and red numbered 51 to 54 in the order of their closeness to the defective pixel 31.

Figure 5:
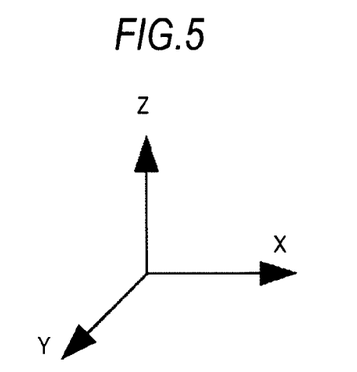
FIG. 5 is an illustration for explaining coordinate axes.

FIG. 5 is an illustration for explaining coordinate axes. As shown in FIG. 5, a pixel value is represented in the direction of Z-axis which is perpendicular to the X-Y plane.

Figure 6:
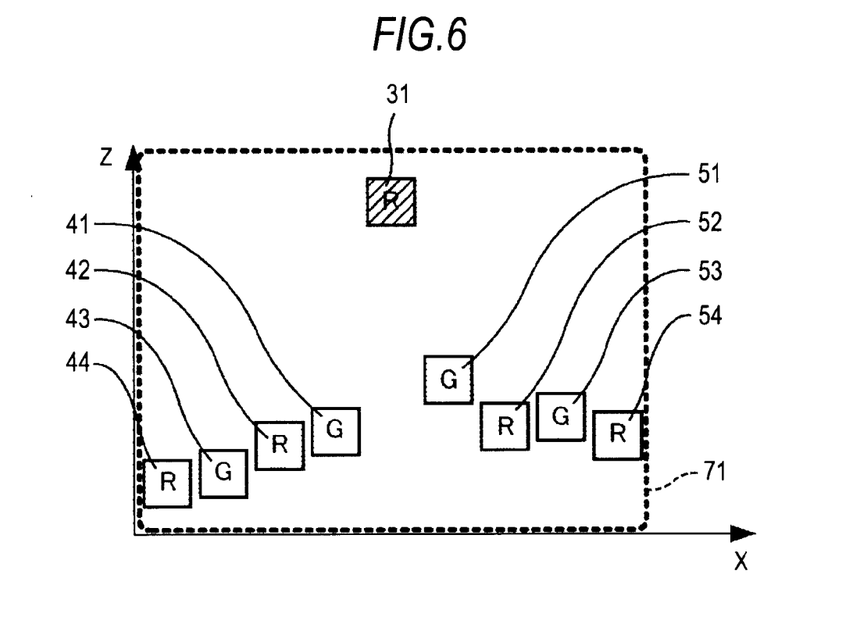
FIG. 6 is a graph for explaining the pixel values of the defective pixel and the neighboring pixels.

FIG. 6 is a graph for explaining the pixel values of the defective pixel and the neighboring pixels. The horizontal axis X of FIG. 6 represents pixel positions in the horizontal direction of the pixel array unit 11, and the vertical axis Z represents the pixel value of each pixel. The pixels 44, 43, 42, and 41 have pixel values ascending in the order in which the pixels are listed. The pixels 51, 52, 53, and 54 basically have pixel values descending in the order in which the pixels are listed except that the pixel value of the pixel 53 is slightly greater than the pixel value of the pixel 52. The pixel value of the defective pixel 31 is greater than the pixel values of the neighboring pixels 41 to 44 and 51 to 54.

Figure 7:
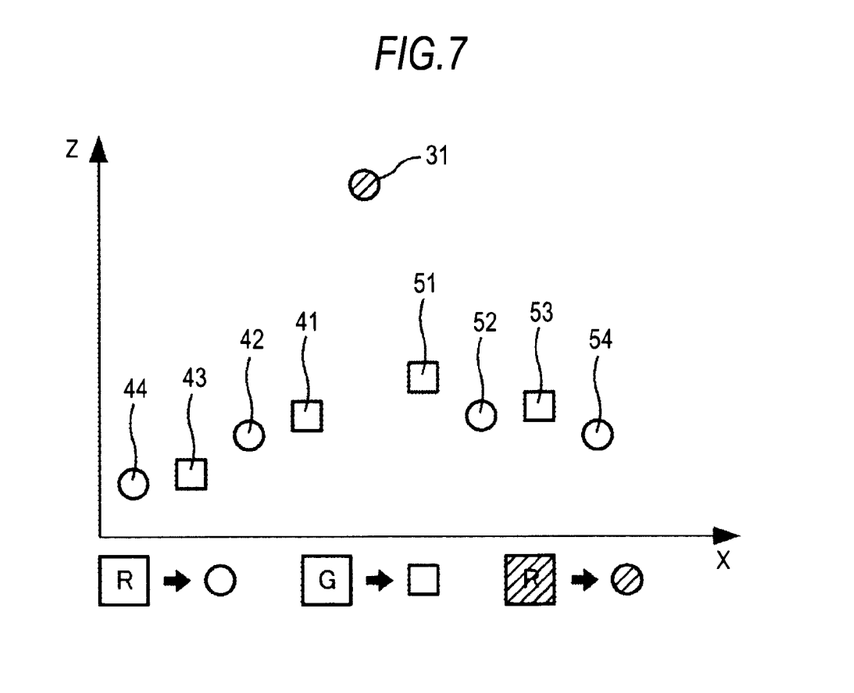
FIG. 7 is another graph for explaining the pixel values of the defective pixel and the neighboring pixels.

FIG. 7 is a graph for explaining the pixel values of the defective pixel and the neighboring pixels. In FIG. 7, the R pixels shown in FIG. 6 are represented by circles, and the G pixels are represented by squares. The defective pixel 31 which is an R pixel is represented by a hatched circle.

Figure 8:
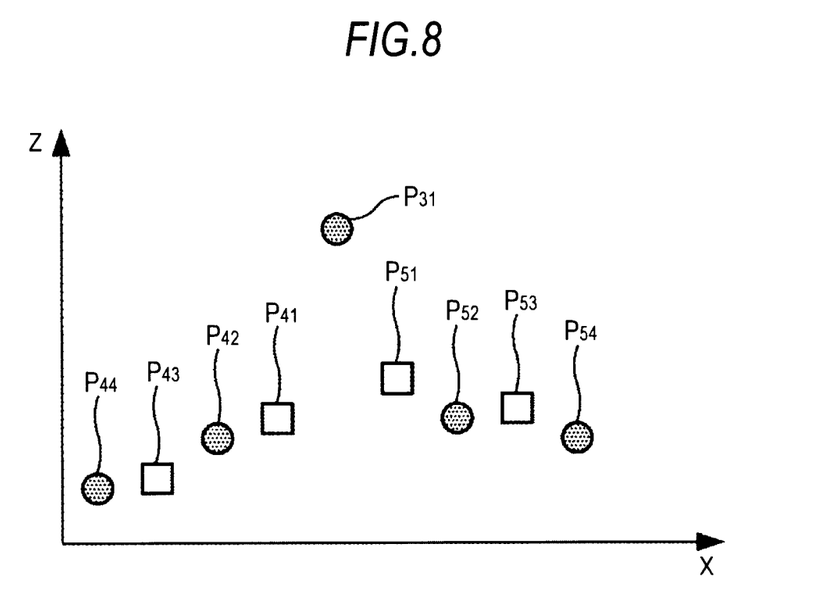
FIG. 8 is another graph for explaining the pixel values of the defective pixel and the neighboring pixels.

FIG. 8 is another graph for explaining the pixel values of the defective pixel and the neighboring pixel. In FIG. 8, the pixels shown in FIG. 7 are represented in a form that is commonly used. Specifically, the defective pixel 31 is referred to as "pixel of interest $P_{31}$". The pixels 41 to 44 which are neighboring pixels are referred to as "pixels $P_{41}$ to $P_{44}$", and the pixels 51 to 54 are referred to as "pixels $P_{51}$ to $P_{54}$".

Figure 9:
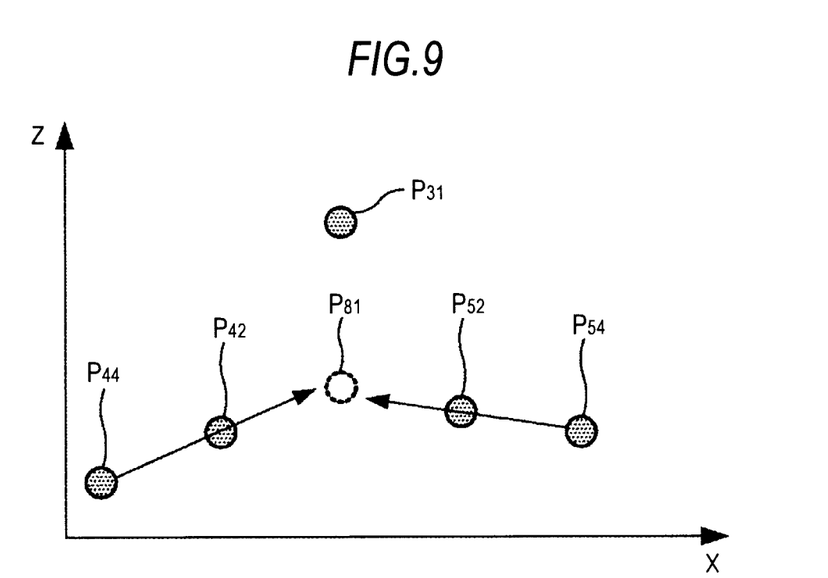
FIG. 9 is a graph for explaining prediction of the pixel value of the defective pixel.

FIG. 9 is a graph for explaining prediction of the pixel value of the defective pixel. As shown in FIG. 9, a predicted pixel $P_{81}$ associated with the pixel of interest $P_{31}$ is obtained from the pixels $P_{44}$, $P_{42}$, $P_{54}$, and $P_{52}$ which are neighboring pixels having the same color as the pixel of interest $P_{31}$. Specifically, the pixel value of the predicted pixel $P_{81}$ is linearly predicted on an assumption that the pixel of interest $P_{31}$ should be located on an imaginary straight line extending through the pixels $P_{44}$ and $P_{42}$. Similarly, the pixel value of the predicted pixel $P_{81}$ is linearly predicted on an assumption that the pixel of interest $P_{31}$ should be located on an imaginary straight line extending through the pixels $P_{54}$ and $P_{52}$. When the prediction results in two different predicted pixel values, any of an average of the two values, the greater predicted value, and the smaller predicted value is selected as a predicted pixel value. This pixel value constitutes a basic pixel value $Z_0$.

Figure 10:
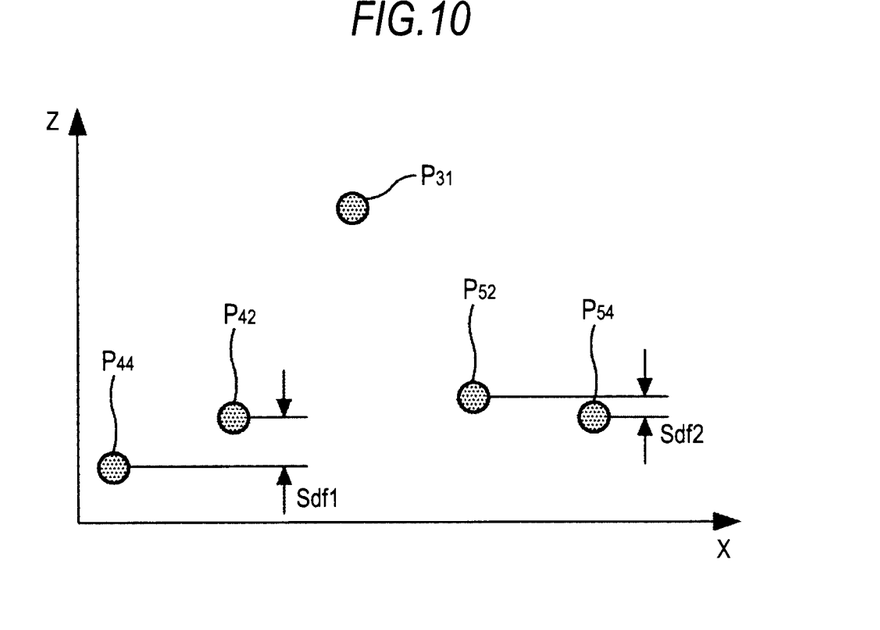
FIG. 10 is a graph for explaining differences between the neighboring pixels having the same color as the pixel of interest.

FIG. 10 is a graph for explaining differences between the neighboring pixels having the same color as the pixel of interest. According to the technique disclosed herein, differences between the neighboring pixels having the same color as the pixel of interest $P_{31}$ are calculated. Specifically, a difference Sdf1 between the pixel values of the pixels $P_{42}$ and $P_{44}$ having the same color is calculated as a difference between the pixels. Similarly, a difference Sdf2 between the pixel values of the pixels $P_{52}$ and $P_{54}$ having the same color is calculated as a difference between the pixels. Either of the differences (for example, the greater difference) is selected as a final same color pixel difference Sdf.

Figure 11:
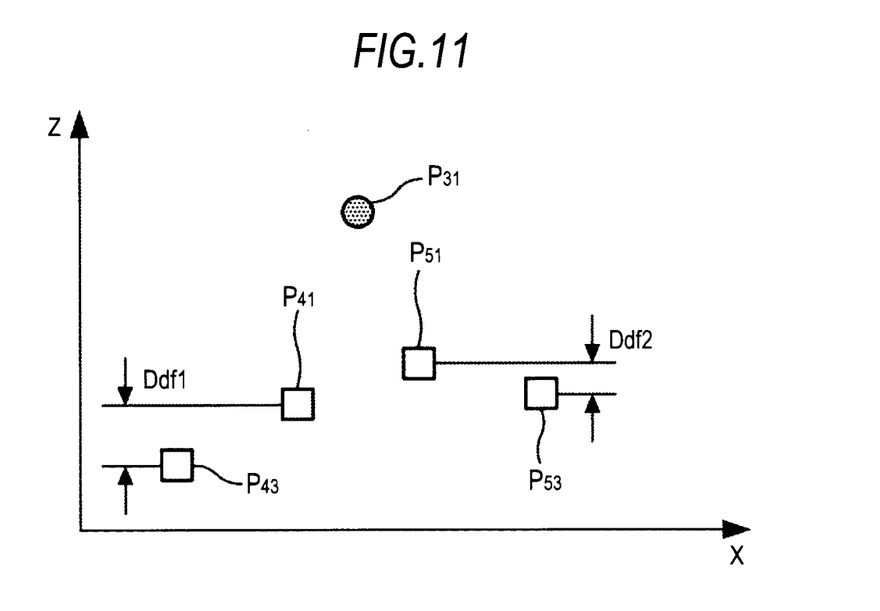
FIG. 11 is a graph for explaining differences between the neighboring pixels having a color different from the color of the pixel of interest.

FIG. 11 is a graph for explaining differences between the neighboring pixels having a color different from the color of the pixel of interest. According to the technique disclosed herein, differences between the neighboring pixels having a color different from the color of the pixel of interest $P_{31}$ are calculated. Specifically, a difference Ddf1 between the pixel values of the pixels $P_{41}$ and $P_{43}$ having a different color is calculated as a difference between the pixels. Similarly, a difference Ddf2 between the pixel values of the pixels $P_{51}$ and $P_{53}$ having a different color is calculated as a difference between the pixels. Either of the differences (for example, the greater difference) is selected as a final different color pixel difference Ddf.

Figure 12:
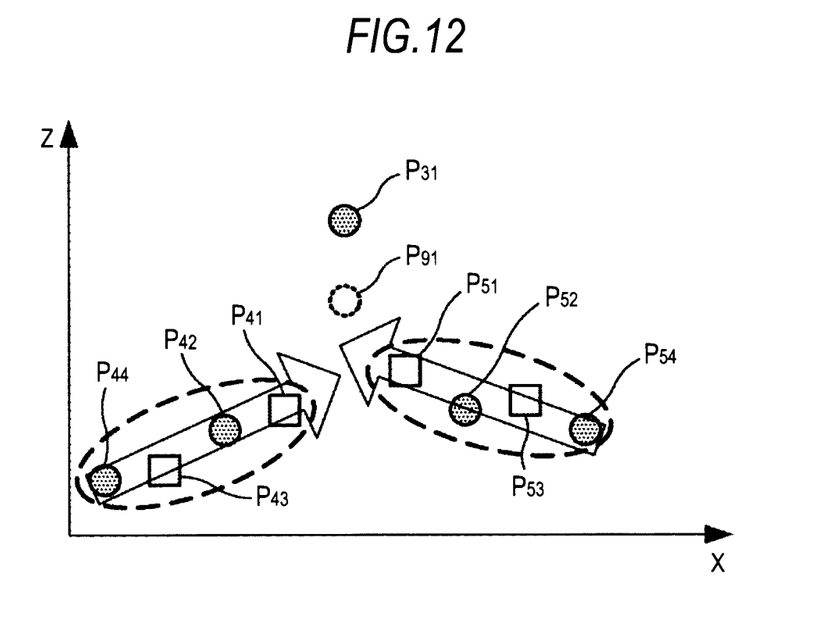
FIG. 12 is a graph for explaining combination of differences.

FIG. 12 is a graph for explaining combination of differences. According to the technique disclosed herein, an estimated value $V_{91}$ is obtained by combining the basic pixel value $Z_0$ of the predicted pixel value $P_{81}$ predicted as described above with reference to FIG. 9, the same color pixel difference Sdf calculated as described above with reference to FIG. 10, and the different color pixel difference Ddf calculated as described above with reference to FIG. 11. A pixel having the estimated pixel value $V_{91}$ is referred to as "estimated pixel $P_{91}$".

Figure 13:
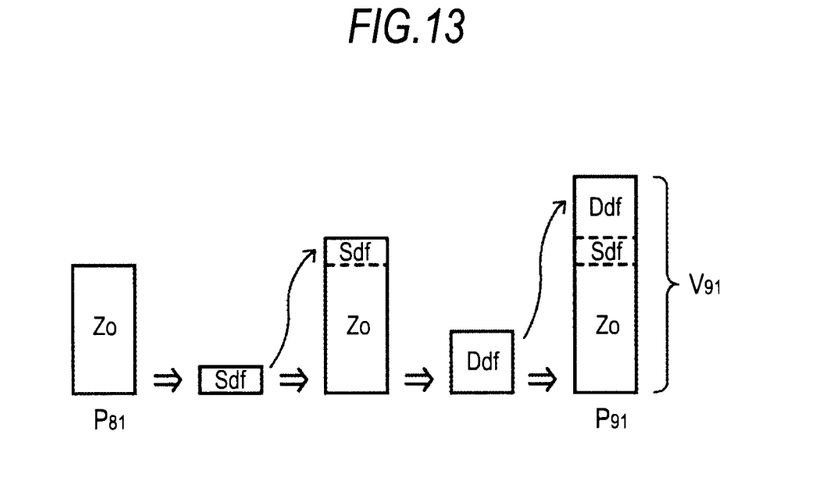
FIG. 13 is a graph for explaining a calculation performed to obtain an estimated value of the pixel of interest.

FIG. 13 is a graph for explaining a calculation performed to obtain an estimated value of the pixel of interest. As shown in the figure, the same color pixel difference Sdf is added to the basic pixel value $Z_0$. Further, the different color pixel difference Ddf is added to the sum of the basic pixel value $Z_0$ and the same color pixel difference Sdf to obtain the estimated value $V_{91}$. The estimated value $V_{91}$, which is the pixel value of the estimated pixel $P_{91}$, is the sum of the basic pixel value $Z_0$, the same color pixel difference Sdf, and the different color pixel difference Ddf.

Figure 14:
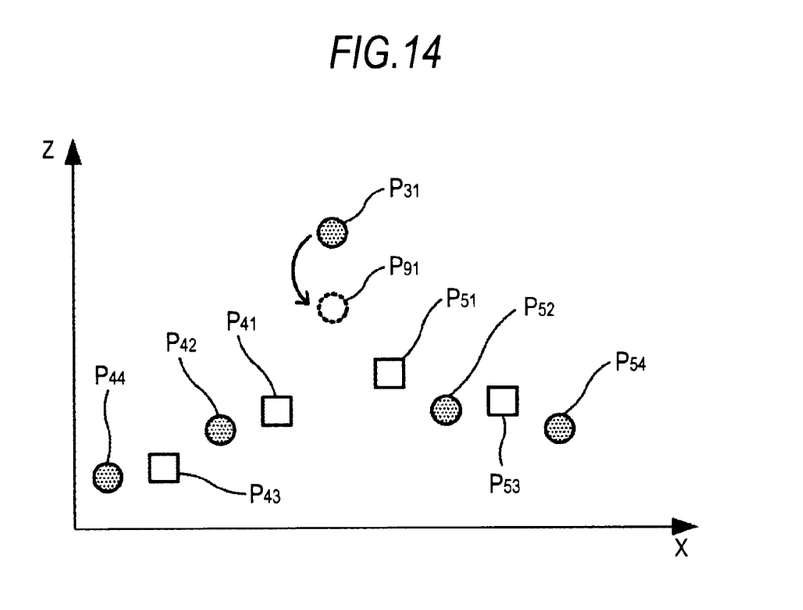
FIG. 14 is a graph for explaining correction carried out on the pixel of interest.

FIG. 14 is a graph for explaining correction carried out on the pixel of interest. According to the technique disclosed herein, the pixel of interest $P_{31}$ is corrected using the estimated pixel $P_{91}$ obtained as described above. Specifically, a pixel value $V_{31}$ of the pixel of interest $P_{31}$ is substituted with the estimated value $V_{91}$ that is the pixel value of the estimated pixel $P_{91}$. Such a correction is made when the pixel value $V_{31}$ of the pixel of interest $P_{31}$ is greater than the estimated value $V_{91}$. Otherwise, such a correction is not made.

The prerequisite that the pixel value $V_{31}$ of the pixel of interest $P_{31}$ should be greater than the estimated value $V_{91}$ applies when the basic pixel value $Z_0$ is greater than the pixel values of the neighboring pixels as shown in FIG. 9. In other words, the prerequisite applies when a shape formed by connecting the pixels $P_{44}$, $P_{42}$, $P_{81}$, $P_{52}$, and $P_{54}$ in FIG. 9 with straight lines points upward.

Figure 15:
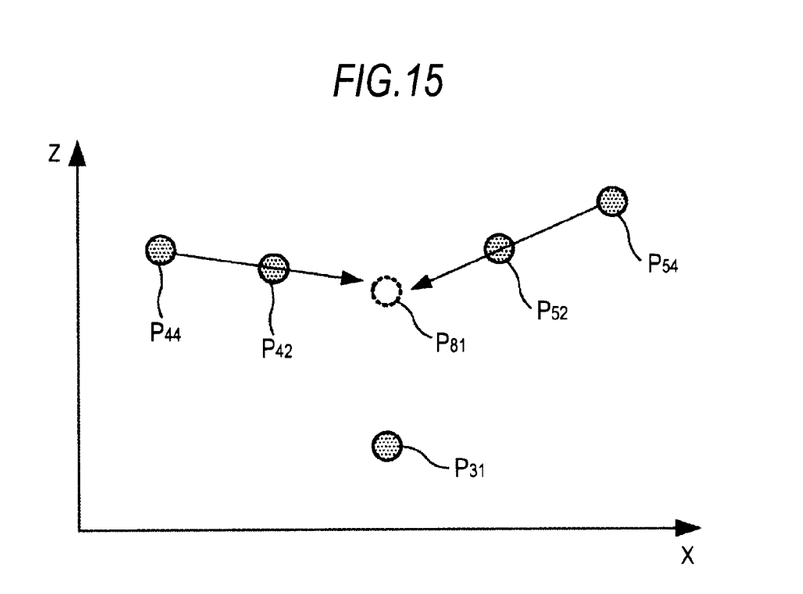
FIG. 15 is a graph for explaining prediction of the pixel value of the defective pixel.

FIG. 15 is a graph for explaining prediction of a correct pixel value of the defective pixel. The shape formed by connecting the pixels $P_{44}$, $P_{42}$, $P_{81}$, $P_{52}$, and $P_{54}$ with straight lines may point downward as shown in FIG. 15 instead of pointing upward as shown in FIG. 9. A process as described below is performed when the basic pixel value $Z_0$ is smaller than the pixel values of the neighboring pixels or when the shape formed by connecting the pixels $P_{44}$, $P_{42}$, $P_{81}$, $P_{52}$, and $P_{54}$ with straight lines points downward.

The pixel value of a predicted pixel $P_{81}$ is linearly predicted as shown in FIG. 15 also in this case, and the pixel value constitutes a basic pixel value $Z_0$. The same color pixel difference Sdf and the different color pixel difference Ddf are calculated in the same manner as in the case shown in FIGS. 10 and 11.

Figure 16:
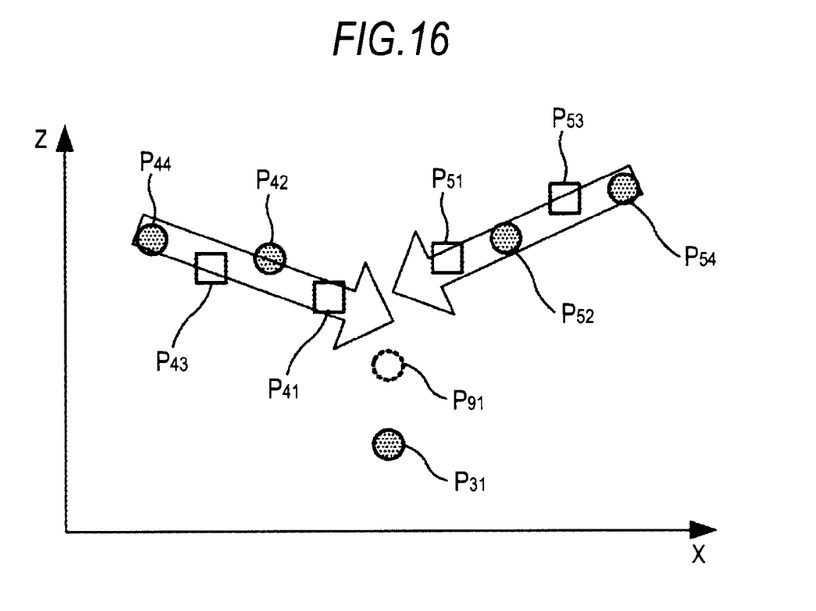
FIG. 16 is a graph for explaining combination of differences.

FIG. 16 is a graph for explaining combination of differences. The basic pixel value $Z_0$, the same color pixel difference Sdf, and the different color pixel difference Ddf are combined to calculate the estimated value $V_{91}$, as shown in FIG. 16. A pixel having the estimated pixel value $V_{91}$ constitutes the estimated pixel $P_{91}$.

Figure 17:
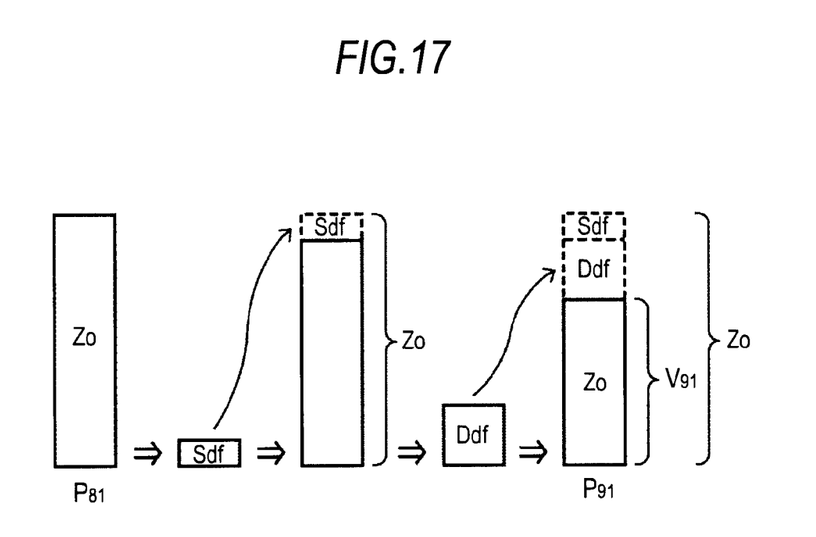
FIG. 17 is a graph for explaining a calculation performed to obtain an estimated value of the pixel of interest.

FIG. 17 is a graph for explaining a calculation performed to obtain an estimated value of the pixel of interest. As shown in the figure, the same color pixel difference Sdf is subtracted from the basic pixel value $Z_0$. Further, the different color pixel difference Ddf is further subtracted from the difference between the basic pixel value $Z_0$ and the same color pixel difference Sdf to obtain the estimated value $V_{91}$. The estimated value $V_{91}$, which is the pixel value of the estimated pixel $P_{91}$, is a value obtained by subtracting the same color pixel difference Sdf and the different color pixel difference Ddf from the basic pixel value $Z_0$. In other words, the estimated value $V_{91}$ is a value obtained by adding the same color pixel difference Sdf and the different color pixel difference Ddf to the basic pixel value $Z_0$ with the polarities of the differences reversed.

Figure 18:
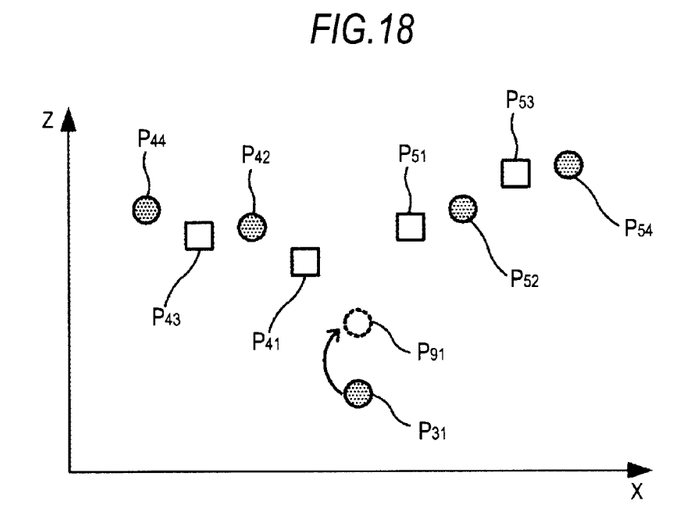
FIG. 18 is a graph for explaining correction carried out on the pixel of interest.

FIG. 18 is a graph for explaining a calculation performed to obtain an estimated value of the pixel of interest. As shown in the figure, the pixel of interest $P_{31}$ is further corrected using the estimated pixel $P_{91}$. Specifically, the pixel value $V_{31}$ of the pixel of interest $P_{31}$ is substituted with the estimated value $V_{91}$ that is the pixel value of the estimated pixel $P_{91}$. Such a correction is made when the pixel value $V_{31}$ of the pixel of interest $P_{31}$ is smaller than the estimated value $V_{91}$. Otherwise, such a correction is not made.

Figure 19:
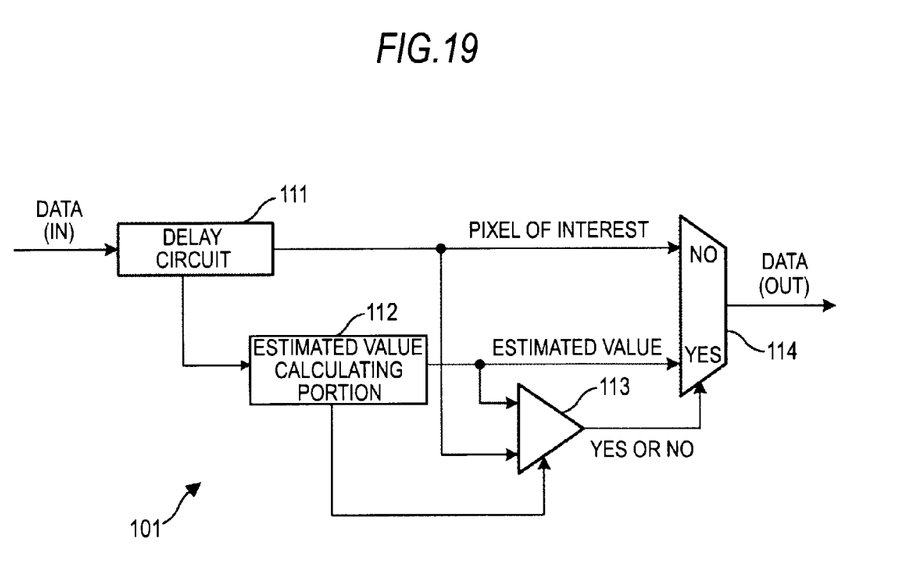
FIG. 19 is a block diagram of a defective pixel correcting process portion showing a configuration thereof.

FIG. 19 is a block diagram of a defective pixel correcting process section 101 showing a configuration thereof. The defective pixel correcting process section 101 is included in the signal processing unit 17. The defective pixel correcting process section 101 is formed by a delay circuit 111, an estimated value calculating portion 112, a comparison circuit 113, and a selection circuit 114.

The delay circuit 111 holds the data of pixel values input from the column processing unit 13 while delaying the data by N clocks associated with the number of pixels included in the range 61 shown in FIG. 4. In the present embodiment, the character N represents 9. That is, the data of the pixels $P_{41}$ to $P_{44}$, the pixel of interest $P_{31}$, the pixels $P_{51}$ to $P_{54}$ are held. The estimated value calculating portion 112 calculates the estimated value $V_{91}$ based on the pixel values held by the delay circuit 111. The selection circuit 114 selects and outputs either of the pixel value $V_{31}$ of the pixel of interest $P_{31}$ output from the delay circuit 111 and the estimated value $V_{91}$ calculated by the estimated value calculating portion 112. The comparison circuit 113 compares the pixel value $V_{31}$ of the pixel of interest $P_{31}$ output from the delay circuit 111 and the estimated value $V_{91}$ calculated by the estimated value calculating portion 112 and exercises control over the selection made by the selection circuit 114 based on the result of comparison. The selection circuit 114 selects the estimated value $V_{91}$ when a signal "YES" is input from the comparison circuit 113 and selects the pixel value $V_{31}$ when a signal "NO" is input.

Figure 20:
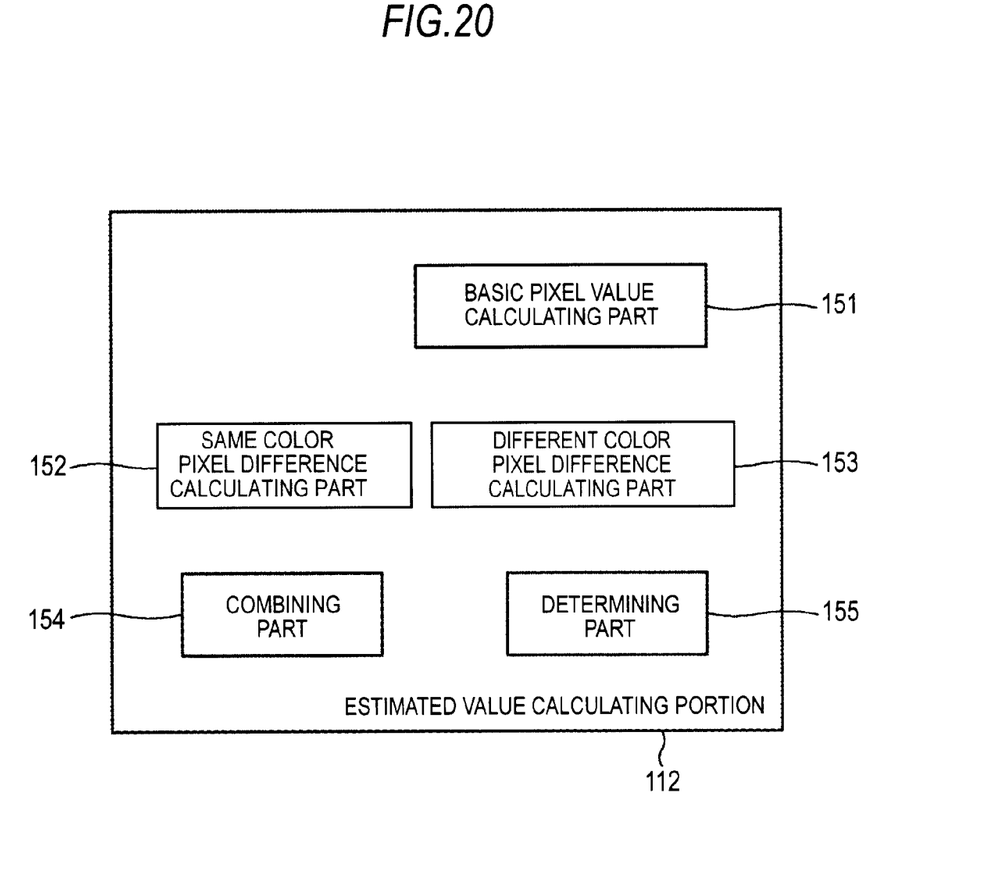
FIG. 20 is a block diagram of an estimated value calculating section showing a functional configuration thereof.

FIG. 20 is a block diagram of the estimated value calculating portion 112 showing a functional configuration thereof. The estimated value calculating portion 112 includes a basic pixel value calculating part 151, a same color pixel difference calculating part 152, a different color pixel difference calculating part 153, a combining part 154, and a determining part 155. Each part can transmit and receive data as occasion demands.

The basic pixel value calculating part 151 calculates the basic pixel value $Z_0$. The same color pixel difference calculating part 152 calculates the same color pixel difference Sdf, and the different color pixel difference calculating part 153 calculates the different color pixel difference Ddf. The combining part 154 combines the basic pixel value $Z_0$, the same color pixel difference Sdf, and the different color pixel difference Ddf to calculate the estimated value $V_{91}$. The determining part 155 determines whether the basic pixel value $Z_0$ is a value greater than the pixel values of the neighboring pixels or not.

Figure 21:
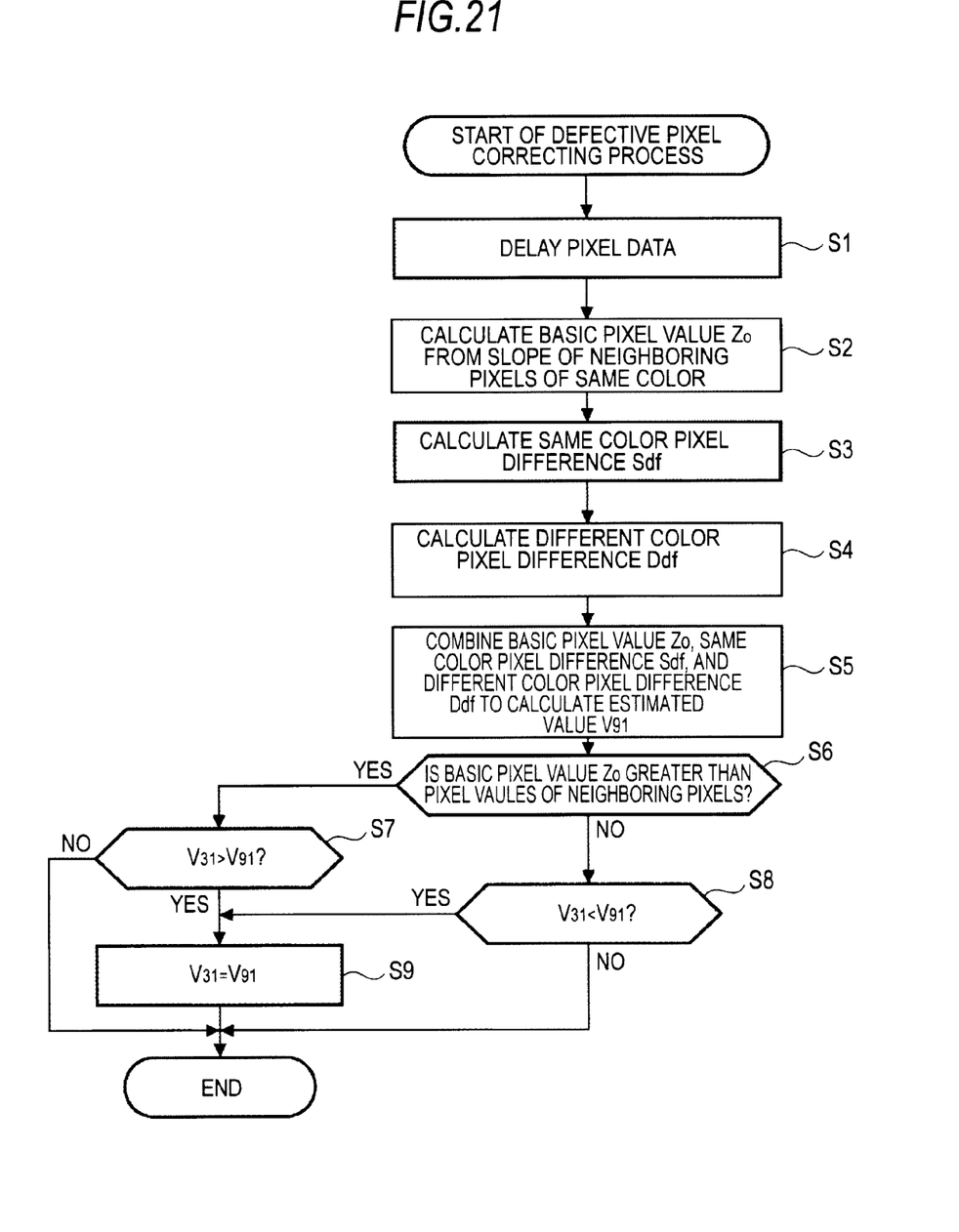
FIG. 21 is a flow chart for explaining a defective pixel correcting process.

FIG. 21 is a flow chart for explaining processes performed by the defective pixel correcting process section 101. The processes of the detective pixel correcting process section 101 will be described below with reference to the flow chart in FIG. 21.

At step S1, the delay circuit 111 sequentially delays and holds 9 pixels worth of pixel value data input thereto and then outputs the data. The delayed pixel data are sequentially supplied to the selection circuit 114. When no defective pixel is detected, the comparison circuit 113 outputs the signal "NO" to control the selection circuit 114 such that the pixel data input from the delay circuit 111 is output as it is downstream of the selection circuit. The data of nine pixel values held by the delay circuit 111 are supplied to the estimated value calculating portion 112.

At step S2, the basic pixel value calculating part 151 of the estimated value calculating portion 112 calculates the basic pixel value $Z_0$ from the slope of the pixel values of neighboring pixels having the same color as the pixel of interest. That is, the predicted pixel $P_{81}$ of the pixel of interest $P_{31}$ is linearly predicted to obtain the basic pixel value $Z_0$ as described above with reference to FIGS. 9 and 15.

At step S3, the same color pixel difference calculating part 152 calculates the same color pixel difference Sdf from the pixel values of neighboring pixels having the same color as the pixel of interest. That is, the same color pixel difference Sdf as described above with reference to FIG. 10 is obtained.

At step S4, the different color pixel difference calculating part 153 calculates the different color pixel difference Ddf from the pixel values of neighboring pixels having a color different from the pixel of interest. That is, the different color pixel difference Ddf as described above with reference to FIG. 11 is obtained.

At step S5, the combining part 154 combines the basic pixel value $Z_0$, the same color pixel difference Sdf, and the different color pixel difference Ddf to calculate the estimated value $V_{91}$. That is, the estimated value $V_{91}$ is calculated as described above with reference to FIGS. 12, 13, 16, and 17.

At step S6, the determining part 155 determines whether the basic pixel value $Z_0$ is greater than the pixel values of the neighboring pixels or not. When the basic pixel value $Z_0$ is greater than the pixel values of the neighboring pixels, the determining part 155 controls the comparison circuit 113 such that the circuit outputs the signal "YES" when the pixel value $V_{31}$ is greater than the estimated value $V_{91}$ and otherwise outputs the signal "NO".

When the basic pixel value $Z_0$ is smaller than the pixel values of the neighboring pixels, the determining part 155 controls the comparison circuit 113 such that the circuit outputs the signal "YES" when the pixel value $V_{31}$ is smaller than the estimated value $V_{91}$ and otherwise outputs the signal "NO".

The signal "YES" is a signal which causes the selection circuit 114 to select the estimated value $V_{91}$, and the signal "NO" is a signal which causes the selection circuit 114 to select the pixel value $V_{31}$.

When it is determined at step S6 that the basic pixel value $Z_0$ is greater than the pixel values of the neighboring pixels, the comparison circuit 113 compares the pixel value $V_{31}$ of the pixel of interest $P_{31}$ with the estimated value $V_{91}$ of the estimated pixel $P_{91}$ at step S7 to determine whether the pixel value $V_{31}$ is greater than the estimated value $V_{91}$. When the pixel value $V_{31}$ is greater than the estimated value $V_{91}$, the signal "YES" is output from the comparison circuit 113. At step S9, the selection circuit 114 therefore selects and outputs the estimated value $V_{91}$ which has been output from the estimated value calculating portion 112. That is, a process of substituting the pixel value $V_{31}$ with the estimated value $V_{91}$ is carried out. When the pixel value $V_{31}$ is not greater than the estimated value $V_{91}$, the substituting process at step S9 is not carried out. Then, the comparison circuit 113 outputs the signal "NO", and the selection circuit 114 selects and outputs the pixel value $V_{31}$.

When it is determined at step S6 that the basic pixel value $Z_0$ is not greater than the pixel values of the neighboring pixels, the comparison circuit 113 compares the pixel value $V_{31}$ of the pixel of interest $P_{31}$ with the estimated value $V_{91}$ of the estimated pixel $P_{91}$ at step S8 to determine whether the pixel value $V_{31}$ is smaller than the estimated value $V_{91}$. When the pixel value $V_{31}$ is smaller than the estimated value $V_{91}$, the signal "YES" is output from the comparison circuit 113. At step S9, the selection circuit 114 therefore selects and outputs the estimated value $V_{91}$ which has been output from the estimated value calculating portion 112. That is, a process of substituting the pixel value $V_{31}$ with the estimated value $V_{91}$ is carried out. When the pixel value $V_{31}$ is not smaller than the estimated value $V_{91}$, the substituting process at step S9 is not carried out. Then, the comparison circuit 113 outputs the signal "NO", and the selection circuit 114 selects and outputs the pixel value $V_{31}$.

The pixel value of a defective pixel on each line is corrected as described above. Since an estimated value is calculated based on the different color pixel difference Ddf, the generation of a false color is suppressed, and a color can be precisely rendered.

When it is principally intended to suppress the generation of a false color, the estimated value $V_{91}$ may be calculated without using the same color pixel difference Sdf.

Figure 22:
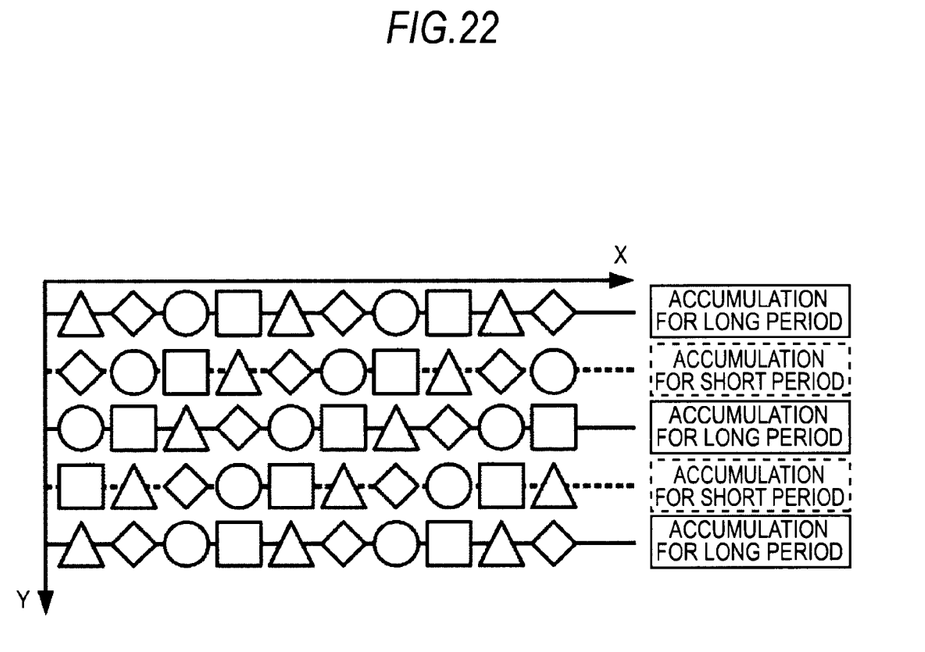
FIG. 22 is a diagram showing a case in which each line has a different accumulation time.

FIG. 22 is a diagram for explaining a case in which pixel data accumulation time varies from one line to another. In the case of an object having different spatial frequency components, the accumulation time of pixel data may vary from one line to another. In the example shown in FIG. 22, an image is rendered using pixels in four colors which are represented by triangles, rhombuses, circles, and squares. Pixel data on the first, third, and fifth lines are accumulated for a long period of time, and pixel data on the second and fourth lines are accumulated for a shorter period of time. Let us assume that a defective pixel is to be detected from pixel data on a plurality of lines (e.g., data of 3×3 pixels) and that a corrective pixel value for correcting the pixel value of the defective pixel is to be generated. In such a case, it is difficult to control pixel data accumulation time; many parameters are required; and the operation involves complicated algorithm.

According to the technique of the present disclosure, neighboring pixels to be used for correcting a pixel of interest are pixels residing on the same line as the pixel of interest. It is therefore possible to detect a defective pixel easily and to calculate a corrective pixel value even in a situation as described above. As a result, simple algorithm may be used, and no complicated signal processing is required.

There is no need for setting thresholds for a gain and shooting conditions depending on a scene of interest, and a smaller number of parameters are therefore required. An estimated pixel value can be calculated taking luminance, shot noise, and the amounts of different color signals into account. It is therefore possible to detect and correct a defect accurately while maintaining a certain level of image quality. A defect can be properly detected and corrected without storing positions of defective pixels and corrective values associated therewith in a memory in advance.

Although an application of the disclosed technique to an image sensor has been described above by way of example, the disclosed technique may be applied to image processing apparatus such as line sensors and displays.

The above-described series of processes may be implemented using hardware, and the processes may alternatively be implemented on a software basis.

When the series of processes is implemented on a software basis, a program constituting the software is installed in the storage unit 16 from a network or a recording medium.

Steps described as programs according to the present disclosure may include not only processes performed in a time sequential manner in the order in which they are described but also parallel or separate processes which are not necessarily performed in a time sequential manner.

The technique disclosed herein is not limited to the above-described embodiment, and various modifications may be made without departing the spirit of the present disclosure.

The technique disclosed herein may be implemented in the following configurations.

(1) An image processing apparatus including:
a holding section holding a pixel value input thereto;
a basic pixel value calculating section calculating a basic pixel value from the pixel values of a plurality of pixels which are neighboring pixels located around a pixel of interest having the pixel value held by the holding section and which have the same color as the pixel of interest;
a different color pixel difference calculating section calculating a different color pixel difference which is a difference between the pixel values of neighboring pixels having a color different from the color of the pixel of interest;
a combining section combining the basic pixel value and the different color pixel difference to calculate an estimated pixel value of the pixel of interest; and a correcting section correcting the pixel value of the pixel of interest to the estimated value.

(2) The image processing apparatus according to the above item (1), wherein the different color pixel difference calculating section may calculate a difference between the pixel values of a plurality of pixels residing on the same line on which the pixel of interest resides, preceding the pixel of interest on the line, and having a color different from the color of the pixel of interest as the different color pixel difference. The different color pixel difference may alternatively calculate a difference between the pixel values of a plurality of pixels residing on the same line on which the pixel of interest resides, succeeding the pixel of interest on the line, and having a color different from the color of the pixel of interest as the different color pixel difference.

(3) The image processing apparatus according to the above item (1) or (2), wherein the different color pixel difference calculated by the different color pixel difference calculating section may be either the difference between the pixel values of the plurality of pixels preceding the pixel of interest and having a different color or the difference between the pixel values of the plurality of pixels succeeding the pixel of interest and having a different color whichever is greater.

(4) The image processing apparatus according to any of the items (1), (2), or (3), which further includes
a same color pixel difference calculating section calculating a same color pixel difference which is a difference between the pixel values of neighboring pixels having the same color as the pixel of interest, wherein
the combining section may combine the basic pixel value, the different color pixel difference, and the same color pixel difference to calculate the estimated value.

(5) The image processing apparatus according to any of the above items (1) to (4), wherein the same color pixel difference calculating section may calculate a difference between the pixel values of a plurality of pixels residing on the same line on which the pixel of interest resides, preceding the pixel of interest on the line, and having the same color as the pixel of interest as the same color pixel difference. The same color pixel difference calculating section may alternatively calculate a difference between the pixel values of a plurality of pixels residing on the same line on which the pixel of interest resides, succeeding the pixel of interest on the line, and having the same color as the pixel of interest as the same color pixel difference.

(6) The image processing apparatus according to any of the items (1) to (5), wherein the same color pixel difference calculated by the same color pixel difference calculating section may be either the difference between the pixel values of the plurality of pixels preceding the pixel of interest and having the same color or the difference between the pixel values of the plurality of pixels succeeding the pixel of interest and having the same color whichever is greater.

(7) The image processing apparatus according to any of the items (1) to (5), wherein the correcting section may correct the pixel value of the pixel of interest when the pixel value of the pixel of interest is greater than the estimated value in the case that the basic pixel value is greater than the pixel values of the neighboring pixels and may correct the pixel value of the pixel of interest when the pixel value of the pixel of interest is smaller than the estimated value in the case that the basic pixel value is smaller than the pixel values of the neighboring pixels.

(8) The image processing apparatus according to any of the items (1) to (7), which is an image sensor.

(9) An image processing method including:
holding a pixel value input thereto;
calculating a basic pixel value from the pixel values of a plurality of pixels which are neighboring pixels located around a pixel of interest having the held pixel value and which have the same color as the pixel of interest;
calculating a different color pixel difference which is a difference between the pixel values of neighboring pixels having a color different from the color of the pixel of interest;

combining the basic pixel value and the different color pixel difference to calculate an estimated pixel value of the pixel of interest; and correcting the pixel value of the pixel of interest to the estimated value.

(10) A recording medium having a program recorded therein, the program causing a computer to:

hold a pixel value input thereto;

calculate a basic pixel value from the pixel values of a plurality of pixels which are neighboring pixels located around a pixel of interest having the held pixel value and which have the same color as the pixel of interest;

calculate a different color pixel difference which is a difference between the pixel values of neighboring pixels having a color different from the color of the pixel of interest;

combine the basic pixel value and the different color pixel difference, thereby calculating an estimated pixel value of the pixel of interest; and correct the pixel value of the pixel of interest to the estimated value.

(11) A program causing a computer to:

hold a pixel value input thereto;

calculate a basic pixel value from the pixel values of a plurality of pixels which are neighboring pixels located around a pixel of interest having the held pixel value and which have the same color as the pixel of interest;

calculate a different color pixel difference which is a difference between the pixel values of neighboring pixels having a color different from the color of the pixel of interest;

combine the basic pixel value and the different color pixel difference, thereby calculating an estimated pixel value of the pixel of interest; and correct the pixel value of the pixel of interest to the estimated value.

The present disclosure contains subject matter related to that disclosed in Japanese Priority Patent Application JP 2011-073046 filed in the Japan Patent Office on Mar. 29, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
circuitry configured to:
  hold a pixel value input thereto;
  calculate a basic pixel value from pixel values of a plurality of pixels which are neighboring pixels preceding and succeeding a pixel of interest having the pixel value held and which have the same color as the pixel of interest;
  calculate a different color pixel difference which is a difference between pixel values of neighboring pixels having a color different from the color of the pixel of interest;
  calculate a same color pixel difference which is a difference between pixel values of neighboring pixels having the same color as the pixel of interest;
  combine the basic pixel value, the different color pixel difference, and the same color pixel difference to calculate an estimated pixel value of the pixel of interest; and
  correct the pixel value of the pixel of interest to the estimated value.

2. The image processing apparatus according to claim 1, wherein the circuitry is further configured to calculate a difference between the pixel values of a plurality of pixels residing on the same line on which the pixel of interest resides, preceding the pixel of interest on the line, and having a color different from the color of the pixel of interest or a difference between the pixel values of a plurality of pixels residing on the same line on which the pixel of interest resides, succeeding the pixel of interest on the line, and having a color different from the color of the pixel of interest, as the different color pixel difference.

3. The image processing apparatus according to claim 2, wherein the calculated different color pixel difference is either the difference between the pixel values of the plurality of pixels preceding the pixel of interest and having a different color or the difference between the pixel values of the plurality of pixels succeeding the pixel of interest and having a different color whichever is greater.

4. The image processing apparatus according to claim 1, wherein the circuitry is further configured to calculate a difference between the pixel values of a plurality of pixels residing on the same line on which the pixel of interest resides, preceding the pixel of interest on the line, and having the same color as the pixel of interest or a difference between the pixel values of a plurality of pixels residing on the same line on which the pixel of interest resides, succeeding the pixel of interest on the line, and having the same color as the pixel of interest, as the same color pixel difference.

5. The image processing apparatus according to claim 4, wherein the calculated same color pixel difference is either the difference between the pixel values of the plurality of pixels preceding the pixel of interest and having the same color or the difference between the pixel values of the plurality of pixels succeeding the pixel of interest and having the same color whichever is greater.

6. The image processing apparatus according to claim 5, wherein the circuitry is further configured to correct the pixel value of the pixel of interest when the pixel value of the pixel of interest is greater than the estimated value in the case that the basic pixel value is greater than the pixel values of the neighboring pixels and correct the pixel value of the pixel of interest when the pixel value of the pixel of interest is smaller than the estimated value in the case that the basic pixel value is smaller than the pixel values of the neighboring pixels.

7. The image processing apparatus according to claim 6, further comprising an image sensor.

8. An image processing method comprising:
  holding a pixel value input thereto;
  calculating a basic pixel value from pixel values of a plurality of pixels which are neighboring pixels preceding and succeeding a pixel of interest having the held pixel value and which have the same color as the pixel of interest;
  calculating a different color pixel difference which is a difference between pixel values of neighboring pixels having a color different from the color of the pixel of interest;
  calculating a same color pixel difference which is a difference between pixel values of neighboring pixels having the same color as the pixel of interest;
  combining the basic pixel value, the different color pixel difference, and the same color pixel difference to calculate an estimated pixel value of the pixel of interest; and
  correcting the pixel value of the pixel of interest to the estimated value.

9. The image processing method according to claim 8, wherein calculating the different color pixel difference includes calculating a difference between the pixel values of a plurality of pixels residing on the same line on which the pixel of interest resides, preceding the pixel of interest on the line, and having a color different from the color of the pixel of interest or a difference between the pixel values of a plurality of pixels residing on the same line on which the pixel of interest resides, succeeding the pixel of interest on the line, and having a color different from the color of the pixel of interest, as the different color pixel difference.

10. The image processing method according to claim 9, wherein the calculated different color pixel difference is either the difference between the pixel values of the plurality of pixels preceding the pixel of interest and having a different color or the difference between the pixel values of the plurality of pixels succeeding the pixel of interest and having a different color whichever is greater 11. The image processing method according to claim 8, wherein calculating the same color pixel difference includes calculating a difference between the pixel values of a plurality of pixels residing on the same line on which the pixel of interest resides, preceding the pixel of interest on the line, and having the same color as the pixel of interest or a difference between the pixel values of a plurality of pixels residing on the same line on which the pixel of interest resides, succeeding the pixel of interest on the line, and having the same color as the pixel of interest, as the same color pixel difference.

12. The image processing method according to claim 11, wherein the calculated same color pixel difference is either the difference between the pixel values of the plurality of pixels preceding the pixel of interest and having the same color or the difference between the pixel values of the plurality of pixels succeeding the pixel of interest and having the same color whichever is greater.

13. The image processing method according to claim 12, wherein correcting the pixel value of the pixel of interest includes correcting the pixel value of the pixel of interest when the pixel value of the pixel of interest is greater than the estimated value in the case that the basic pixel value is greater than the pixel values of the neighboring pixels and correcting the pixel value of the pixel of interest when the pixel value of the pixel of interest is smaller than the estimated value in the case that the basic pixel value is smaller than the pixel values of the neighboring pixels.

14. The image processing method according to claim 13, wherein the pixel values are taken from an image sensor.

15. A non-transitory recording medium having a program recorded therein, the program which when executed causes a computer to:
hold a pixel value input thereto;
calculate a basic pixel value from pixel values of a plurality of pixels which are neighboring pixels preceding and succeeding a pixel of interest having the held pixel value and which have the same color as the pixel of interest;
calculate a different color pixel difference which is a difference between pixel values of neighboring pixels having a color different from the color of the pixel of interest;
calculate a same color pixel difference which is a difference between pixel values of neighboring pixels having the same color as the pixel of interest;
combine the basic pixel value, the different color pixel difference, and the same color pixel difference, thereby calculating an estimated pixel value of the pixel of interest; and
correct the pixel value of the pixel of interest to the estimated value.

16. The non-transitory recording medium according to claim 15, wherein calculating the different color pixel difference includes calculating a difference between the pixel values of a plurality of pixels residing on the same line on which the pixel of interest resides, preceding the pixel of interest on the line, and having a color different from the color of the pixel of interest or a difference between the pixel values of a plurality of pixels residing on the same line on which the pixel of interest resides, succeeding the pixel of interest on the line, and having a color different from the color of the pixel of interest, as the different color pixel difference.

17. The non-transitory recording medium according to claim 16, wherein the calculated different color pixel difference is either the difference between the pixel values of the plurality of pixels preceding the pixel of interest and having a different color or the difference between the pixel values of the plurality of pixels succeeding the pixel of interest and having a different color whichever is greater 18. The non-transitory recording medium according to claim 15, wherein calculating the same color pixel difference includes calculating a difference between the pixel values of a plurality of pixels residing on the same line on which the pixel of interest resides, preceding the pixel of interest on the line, and having the same color as the pixel of interest or a difference between the pixel values of a plurality of pixels residing on the same line on which the pixel of interest resides, succeeding the pixel of interest on the line, and having the same color as the pixel of interest, as the same color pixel difference.

19. The non-transitory recording medium according to claim 18, wherein the calculated same color pixel difference is either the difference between the pixel values of the plurality of pixels preceding the pixel of interest and having the same color or the difference between the pixel values of the plurality of pixels succeeding the pixel of interest and having the same color whichever is greater.

20. The non-transitory recording medium according to claim 19, wherein correcting the pixel value of the pixel of interest includes correcting the pixel value of the pixel of interest when the pixel value of the pixel of interest is greater than the estimated value in the case that the basic pixel value is greater than the pixel values of the neighboring pixels and correcting the pixel value of the pixel of interest when the pixel value of the pixel of interest is smaller than the estimated value in the case that the basic pixel value is smaller than the pixel values of the neighboring pixels.

21. The non-transitory recording medium according to claim 20, wherein the pixel values are taken from an image sensor.

* * * * *